May 4, 1965   C. L. LONGERT   3,181,578
DEVICE FOR THE MECHANICAL PROCESSING
OF STANDING TREES
Filed March 12, 1962   3 Sheets-Sheet 1

INVENTOR.
Christian L. Longert
BY Werner W. Kleeman
ATTORNEY

May 4, 1965　　　　　C. L. LONGERT　　　　3,181,578
DEVICE FOR THE MECHANICAL PROCESSING
OF STANDING TREES
Filed March 12, 1962　　　　　　　　　　　3 Sheets-Sheet 2
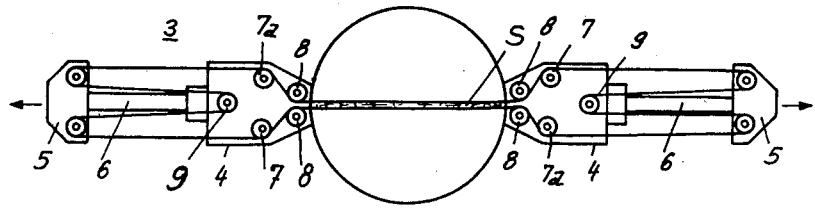
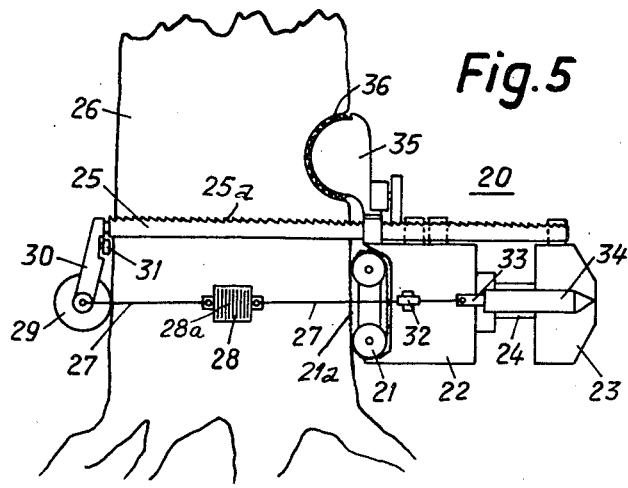
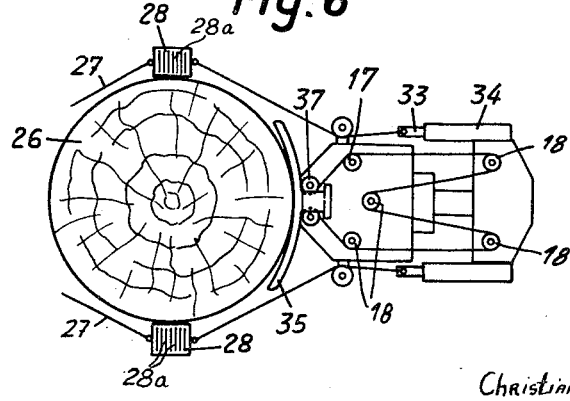
INVENTOR.
Christian L. Longert
BY Werner W. Kleeman
ATTORNEY

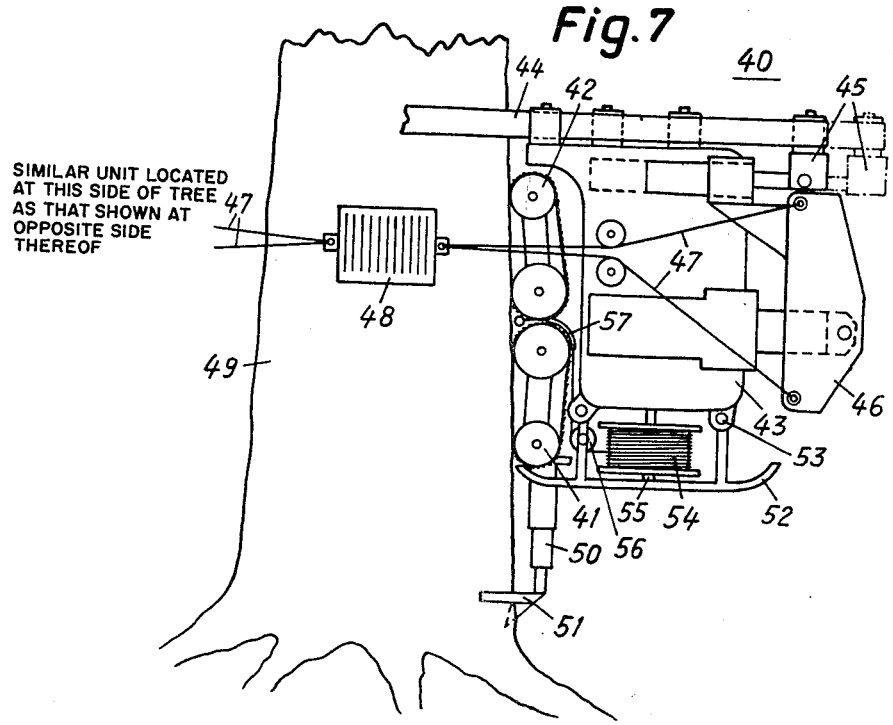
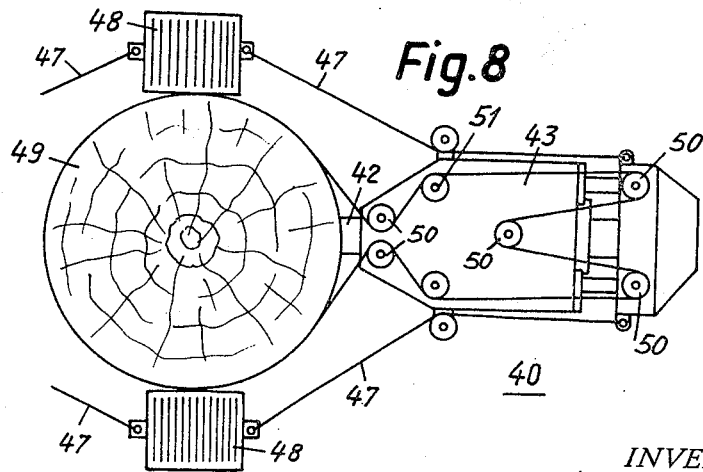

United States Patent Office 3,181,578
Patented May 4, 1965

3,181,578
DEVICE FOR THE MECHANICAL PROCESSING OF STANDING TREES
Christian L. Longert, Pfarrgasse 3, Vaduz, Liechtenstein
Filed Mar. 12, 1962, Ser. No. 179,164
Claims priority, application Switzerland, Aug. 3, 1961, 9,112/61
6 Claims. (Cl. 144—2)

The present invention relates to an improved device for the mechanical working or processing of unfelled trees and, more particularly, for felling such trees or removing their branches and bark. The present application is a continuation-in-part of my copending United States application, Serial No. 754,045, filed August 8, 1958, and entitled "Process and Device for the Mechanical Working of Unfelled Trees," issued April 24, 1962 as patent No. 3,030,986.

The device according to this invention is featured in the provision of an endless flexible member which encircles the tree and is fitted with cutting members, and by a driving unit held against the tree by said flexible member. The driving unit comprises an electric motor preferably actuated by medium frequency alternating current and operatively connected with the flexible member so as to move the same in the circumferential direction, and by a tensioning device which keeps the flexible member taut. If the device is to be employed solely for felling trees, the driving unit bears against the surface of the tree with a housing portion. It is obvious that a plurality of driving units, such as two units, may be used and arranged to rest on the tree trunk in diametrically opposed relationship. For the purpose of debarking and removing branches, however, the device is equipped with a climbing mechanism for each driving unit in the form of caterpillars or rollers which are also driven by electric motors operating with medium frequency current. Each driving unit is preferably provided with two pairs of caterpillars or tracks superimposed in the direction of travel or feed; said pairs ensuring proper positioning on the trunk and preventing the driving unit from tilting. The positioning of the driving units on the tree trunk by means of their climbing mechanisms may be improved by providing in addition to the cutting chain, a further flexible tensioning member encircling the tree, such as a wire rope or other suitable expedient arranged, as far as possible, in the horizontal plane located at the center of the contact area. This supporting member may rest against the tree via rollers, cylinders or the like so as to present a minimum of resistance when the driving unit moves upwards along the tree trunk.

Accordingly, it is a primary object of the present invention to provide an improved mechanism for mechanically working trees in an expedient and reliable manner.

Another important object of the present invention is to provide improved means for felling or debarking and debranching unfelled trees or the like in a safe, reliable and economic manner.

Still a further important object of the present invention is to provide an improved mechanism for working trees by felling or debarking and debranching thereof, and by means of improved climbing means providing for proper contact between said mechanism and the tree to be worked.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modification within the spirit and scope of the invention will become apparent to those skilled in the art from this detailed description.

Figure 1:
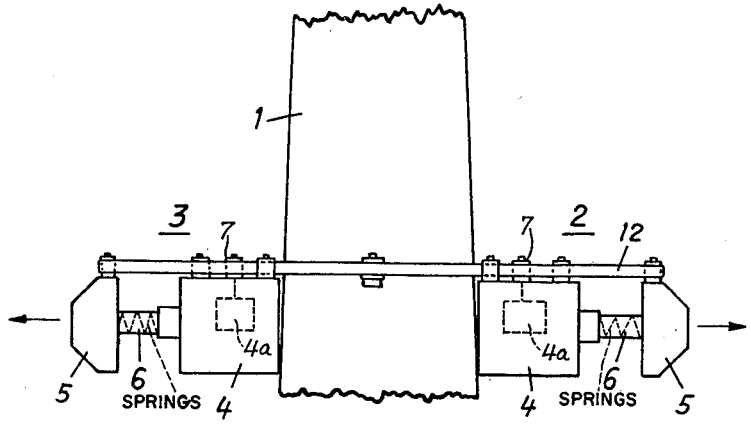
FIGURE 1 is an elevational view of a tree felling device designed according to the present invention.
Figure 3:
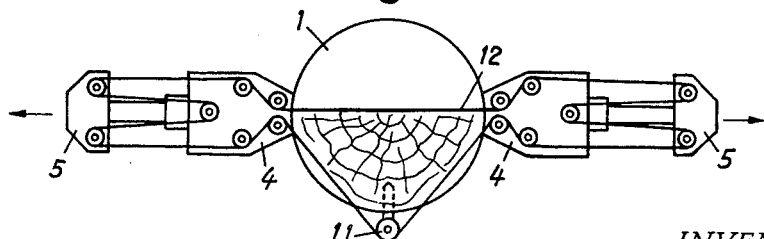

FIGURES 3 and 4 diagrammatically illustrate two further positions of the cutting chain of the device depicted in FIGURE 1 as the felling process proceeds;

FIGURE 5 is an elevational view of a further embodiment of the present invention adapted for debarking and debranching an unfelled tree;

FIGURE 6 is a plan view of the device depicted in FIGURE 5;

FIGURE 7 is an elevational view of another embodiment of a device for debarking and debranching a tree or the like; and FIGURE 8 is a plan view of the device illustrated in FIGURE 7.

Referring now to the drawings, the reference numeral 1 of FIGURE 1 designates a portion of a standing tree which is to be felled. Arranged in diametrically opposed relationship on the tree are two driving units generally designated by numerals 2 and 3. The two driving units 2, 3 are of similar design. Each is provided with a driving portion 4 and a tensioning portion 5, the latter of which is connected with the driving portion by means of a telescopic tube arrangement 6 to which a pressure medium may be admitted. The driving portion 4 contains a source (not shown) for a pressure medium adapted to be admitted to the telescopic pipe or tube 6 which enables the tensioning portions 5 to be moved outward relative to the driving portions 4. The movement may be performed against the action of springs or the like arranged in the tube member 6.

Each driving portion 4 further accommodates a medium frequency, driving motor generally indicated at 4a and supplied with current of 300–400 c.p.s. and operative on a driving roller 7 provided at the upper side of the driving portion 4. The driving housing portion 4 and the tensioning portion 6 of each driving unit 2, 3 are further equipped on their upper ends with guide rollers 8, 7a, 9 and 10. Passing around these guide rollers is a flexible cutting chain 12, which may be of standard design and which is provided with known cutting or sawing teeth extending in an inward cutting direction. From the driving roller 7, the cutting chain 12 passes around one of the rollers of the pair of guide rollers 8 arranged as closely as possible to each other and to the surface of the tree trunk. This cutting chain 12 then passes about a guide-roller 11 displaced by approximately 90° and temporarily fixed to the tree trunk.

Upon reaching the opposite driving unit 2 or 3, the cutting chain 12 first passes around one of the guide rollers 8, then around roller 7a, and then to the associated tensioning portion 5 via one of the guide rollers 10. Before passing to the second guide roller 10 and hence to the driving roller 7, the cutting chain 12 returns to the tensioning roller 9 of its associated driving portion 4. Displacement of the tensioning portions 5 relative to the driving portions 4, thus enables not only the cutting chain 12 to be tensioned but any shortening or slackening of the cutton chain portion about the tree trunk 1 to be compensated. The details of a possible arrangement and construction of the driving portions 4 and telescopic tube arrangement 6 for each driving unit 2, 3 have been clearly described and set forth in my United States Patent 3,030,986 mentioned herein at the outset.

Figure 2:
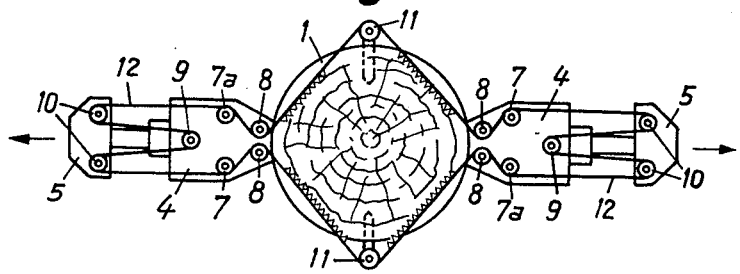
FIGURE 2 is a plan view of the device shown in FIGURE 1.

As shown in FIGURE 2, cuts are first made in the surface of the tree to be felled by passing the cutting chain 12 around two diametrically opposed guide rollers 11. One of the guide rollers 11 is then removed and a cut produced which extends to almost the center of the tree 1 (FIG. 3). The second guide roller 11 may thereafter be removed as well, so that the tree receives two cuts from opposite sides, thereby leaving only a narrow intact portion S (FIG. 4). The width of this intact portion S depends upon the spacing of the guide rollers 8 and may be changed by adjusting such spacing. As shown in FIGURE 4, the two tensioning portions 5 are in their fully extended position to compensate for straightening of the cutting chain 12 between the two driving portions 4.

FIGURES 5 and 6 illustrate an embodiment of the device which is primarily designed for removing branches and bark. In contrast with the embodiment of FIGURES 1 through 4, the device according to FIGURES 5 and 6 is provided with only a single driving unit 20, said unit being equipped with a climbing mechanism 21 provided with caterpillars or tracks 21a driven by appropriate driving wheels. The driving unit 20 is again conveniently subdivided into a driving portion 22 and a tensioning portion 23 connected with each other by means of telescopic tube means 24. A cutting chain 25 is passed around appropriate tensioning rollers 18, 37 and a driving roller 17 arranged on the driving portion 22, in a manner similar to the embodiment of FIGURES 1-4. The upper edge of this chain 25 is equipped with saw or cutting teeth 25a. In order to hold the device firmly on the tree trunk 26, the latter is encompassed not only by the cutting chain 25, but also by tensioning cable unit 27 incorporating a number of individual cables as shown, and which rests not directly on the surface of the tree but is attached to cable tensioning rollers 28 and 29 (FIG. 6). The cable rollers 28 and 29 may be provided with engaging teeth, as schematically depicted at 28a, and may rotate relative to the tensioning cable 27 to roll on the surface of the tree 26.

On its fixed stud or ends, the cable roller 29 carries an upwardly extending bracket arm 30 which engages, via an appropriate chain guide 31, the cutting chain 25 so as to connect it with the cable rollers 29 to ensure that the cutting chain 25 and tensioning cable 27 will always be located in substantially parallel planes. It would naturally also be possible to obtain a rotary motion from the cutting chain and to transmit it to the cable roller 29 so that it will assist the driving action of the caterpillar unit 21 located on the opposite side of the tree 26. In order to enable the device to be removed from the tree, the tensioning cable 27 is provided with a chain lock mechanism 32. The two ends of the tensioning cable are connected to two piston rods 33 mounted within pressure cylinders 34 which enable the tensioning cable 27 to be tensioned or released independently of the tension of the cutting chain 25.

Naturally, this modification of the chain tension is additional to the displacement of the tensioning portion obtained by the telescopic tube arrangement 24 and, accordingly, to the cutting chain tension so obtained. Arranged at the top of the driving portion 22 is an auxiliary branch sawing or cutting device 35 which is equipped with a driven sawing or cutting chain 36 passing around a corresponding guide plate. The auxiliary cutting device 35 extends substantially over the width of the driving unit 20 and removes any branches or foliage located in the path of movement of said driving unit before such branches may disrupt climbing and proper functioning thereof. At the same time, the auxiliary cutting device 35 removes the bark from the surface of the tree at places not readily accessible to the cutting chain 25, i.e. between the tensioning rollers 37.

The embodiment shown in FIGURES 7 and 8 differs from that of FIGURES 5 and 6 mainly in that two driving units 40 are provided of which, however, for convenience in illustration only one whole unit is shown in the drawing. The two driving units 40 are arranged in diametrically opposed relationship on the tree trunk 49 in a manner similar to the embodiment described in FIGURES 1 through 4. A further difference with respect to the embodiment previously disclosed resides in the fact that this driving unit 40 is provided with two superposed and independently supported track or caterpillar units 41 and 42. These caterpillars 41, 42 may be displaced between a driving position and an inoperative or idle position by a suitable adjusting mechanism (not shown), so that the driving portion 43 has its front housing face resting against the tree trunk 49 in the idle position. The cutting chain 44 again passes around a number of tensioning rollers 50 and a driving roller 51 provided on each unit.

The driving unit 40 is equipped with independently operative tensioning portions 45 and 46 in a manner as previously described. The tensioning portions 45 and 46 are again displaceable by hydraulic or pneumatic means, with the upper tensioning portion 45 being designed to tension the cutting chain 44 and the lower tensioning portion 46 designed to tension a supporting mechanism in the form of the clamping cables 47. The clamping cables 47 are again spaced from the surface of the tree 49 by means of cable rollers 48. Extending downwardly from the driving portion 43 is a guide arm 50' which has its lower end provided with a bifurcated or fork-type member 51 which rests against the tree and partially encircles it. The guide arm 50' and its fork member 51 prevent the driving unit 40 from moving out of its desired vertical position. The guide arm 50' advantageously consists of a plurality of telescopically extensible tube sections, which enable it to be telescoped together during transport.

Additionally, a sled member formed of runners or skids 52 is provided on the underside of the driving unit 43, said sled member being detachably secured to the driving unit 40 by means of fastening pins 53 or the like. Instead, it is also equally possible to fixedly attach the transport sled 52 to the driving unit 40 so as not to be detachable, as by welding for example. Arranged on the sled member between the skids 52 is a cable winch 54 which may be coupled to a driving motor, by way of example, the motor driving the caterpillars, via a driving shaft 55. The cable unwound from the winch is passed between the two caterpillars 41 and 42 via the guide roller or pulley 56 and a guide channel 57, whereby the end of the cable may be kept in idle position. The cable winch 54 arranged on the transport sled 52 enable the device to be moved from a processed tree to a tree to be processsed after the cable end has been passed around the new tree and secured to the latter. This is particularly important where the trees are processed in hilly regions or in mountainous territory. During working of the tree, that is, when the clamping cables 47 and the cutting chain 44 have been passed around the tree and tensioned, the cable end of the cable winch may be removed. In order to save power, the cable winch may then be removed from the driving unit 43 together with the sled 52.

It is naturally also possible with the apparatus of FIGURE 7 to provide the driving units 43 with auxiliary branch cutting mechanisms which may be formed of an individual part as in the embodiment according to FIGURES 5 and 6, or of a plurality of members. It is further possible to embrace the tree by means of two chains, the second being located at the lower end of the driving units 40 and driven, by way of example, in a direction opposite to that of the upper chain. The lower chain may be equipped with debarking members, for example, in the form of scratching knives or brushes, which peel the tree until it appears white. If only one chain is provided, it may be rendered operative in the one direction on the trunk's surface by means of sawing cutters, while such peeling members as described above may be rendered operative in the opposite direction of rotation. The driving unit may be designed, by way of example, in the manner as described in my United States patent previously mentioned. Moreover, instead of giving the chain or chains a continuous movement, it is also possible to impart to them an oscillatory motion, that is, back and forth.

Having thus described the present invention what is desired to be secured by United States Letters Patent, is:

1. In a device for the mechanical working of trees and the like, the combination of:
    at least one drive unit adapted to be positioned at the surface of a tree to be worked;
    climbing means attached to said drive unit and disposed on the surface thereof positioned at the surface of said tree to thus enable said drive unit to ascend and descend along said tree;
    flexible cutting chain means disposed at the upper end of said drive unit and circumferentially surrounding said tree;
    a plurality of roller means projecting above said drive unit with said chain means being trained about said roller means;
    at least one of said roller means being driven to cause said cutting chain to rotate;
    a chain means tensioning portion movably mounted in said drive unit and being selectively movable toward and away from said tree;
    at least one of said roller means being mounted upon said tensioning portion whereby relative movement of said tensioning portion controls the tension in said cutting chain means; and
    holding means secured to said drive unit to maintain the same against said tree;
    said holding means including at least one clamping cable means disposed beneath said cutting chain means in at least partially surrounding relationship to said tree;
    a clamping cable tensioning portion movably mounted in said drive unit and being selectively movable toward and away from said tree;
    said clamping cable being secured to said clamping cable tensioning portion whereby relative movement of the latter controls the tension in the former;
    said chain means tensioning portion and said clamping cable tensioning portion being independently operable whereby the tension in said cutting chain and said clamping cable means can be individually controlled and varied.

2. In a device for the mechanical working of trees and the like according to claim 1; wherein cable roller means is secured to said clamping cable for rolling on the surface of said tree and wherein at least one of said cable roller means is provided with bracket means for supporting said clamping cable and cutting chain means in substantially parallel relation.

3. In a device for the mechanical working of trees and the like according to claim 1; including a guide mechanism for said drive unit, said guide mechanism being provided with telescopic arm members extending substantially parallel with said tree and a forked guide member at the free end of said telescopic arm members.

4. In a device for the mechanical working of trees and the like according to claim 1; said flexible cutting chain means being provided with tooth-like cutters.

5. In a device for the mechanical working of trees and the like according to claim 1; wherein gliding skids are supported at the underside of said drive unit.

6. In a device for the mechanical working of trees and the like according to claim 1; wherein said driving means includes an electric motor driven by medium frequency alternating current.

References Cited by the Examiner

UNITED STATES PATENTS

| 1,127,347 | 2/15 | Baldwin et al. | 143—32 |
| 1,299,289 | 4/19 | Berg. | |
| 2,174,525 | 10/39 | Padernal. | |
| 2,482,392 | 9/49 | Whitaker. | |
| 2,727,335 | 12/55 | Susil. | |
| 2,948,311 | 8/60 | McCollum | 144—3 XR |
| 3,030,986 | 4/62 | Longert | 144—2 |

FOREIGN PATENTS

| 28,485 | 11/24 | France. |
| | | (3rd addition to No. 532,609) |
| 578,145 | 6/24 | France. |

LESTER M. SWINGLE, *Primary Examiner.*

EARL EMSHWILLER, WILLIAM W. DYER, JR.,
*Examiners.*